(12) United States Patent
Muchenik Cena et al.

(10) Patent No.: US 12,384,120 B2
(45) Date of Patent: Aug. 12, 2025

(54) ASSEMBLY FIXTURE FOR A MODULAR ROTOR BLADE

(71) Applicant: LM Wind Power A/S, Kolding (DK)

(72) Inventors: Tomas Muchenik Cena, New Orleans, LA (US); Mark Hancock, Southampton (GB); Peter Anthony Broome, Park Ridge, IL (US)

(73) Assignee: LM Wind Power A/S, Kolding (DK)

( * ) Notice: Subject to any disclaimer, the term of this patent is extended or adjusted under 35 U.S.C. 154(b) by 147 days.

(21) Appl. No.: 18/073,729

(22) Filed: Dec. 2, 2022

(65) Prior Publication Data

US 2024/0181724 A1 Jun. 6, 2024

(51) Int. Cl.
  *B29C 70/44* (2006.01)
  *F03D 1/06* (2006.01)
  *B29L 31/08* (2006.01)

(52) U.S. Cl.
  CPC ............ *B29C 70/44* (2013.01); *F03D 1/0675* (2013.01); *B29L 2031/085* (2013.01); *F05B 2220/30* (2013.01); *F05B 2230/23* (2013.01)

(58) Field of Classification Search
  CPC ....... B29C 70/34; B29C 70/342; B29C 70/44; F03D 1/0675; F03D 1/0688; F03D 1/069
  See application file for complete search history.

(56) References Cited

U.S. PATENT DOCUMENTS

| 2008/0181775 A1* | 7/2008 | Livingston | F03D 1/0675 416/224 |
| 2009/0070977 A1* | 3/2009 | Livingston | F03D 13/10 29/525 |
| 2011/0030183 A1* | 2/2011 | Livingston | F03D 13/10 29/281.3 |
| 2012/0107128 A1* | 5/2012 | Kontis | B29C 65/48 416/225 |

(Continued)

FOREIGN PATENT DOCUMENTS

| WO | WO-2020216422 A1 * | 10/2020 | ............ B29C 65/18 |
| WO | WO2022/214428 A1 | 10/2022 | |

OTHER PUBLICATIONS

SMW Hydraulics, Goods Lift, SMW Construction Mini Lift, 2 Pages Retrieved Oct. 19, 2022 from Webpage https://constructionminilift.com/shop/product/goods-lift/.

*Primary Examiner* — Andrew L Swanson
(74) *Attorney, Agent, or Firm* — Dority & Manning, P.A.

(57) ABSTRACT

A method for joining rotor blade segments of a rotor blade includes placing a first blade segment in an assembly fixture. The assembly fixture has an outer carrier and at least one bladder arranged with the outer carrier. The first blade segment has an adhesive applied at one or more locations. The method also includes arranging the first blade segment with a second blade segment at at least one joint using the assembly fixture with the adhesive positioned at the at least one joint. Further, the method includes inflating the at least one bladder to provide pressure to the at least one joint, (Continued)

wherein the pressure causes the adhesive to displace between the first and second blade segments at the at least one joint, thereby securing the first and second blade segments together at the at least one joint. Moreover, the method includes maintaining the pressure via the at least one inflated bladder to allow the adhesive to cure, thereby securing the first and second blade segments together.

13 Claims, 16 Drawing Sheets

(56) References Cited

U.S. PATENT DOCUMENTS

| | | | |
|---|---|---|---|
| 2012/0107129 A1* | 5/2012 | Kulenkampff | B29C 66/61 |
| | | | 29/889.71 |
| 2017/0074236 A1* | 3/2017 | Hynum | F03D 1/0675 |
| 2018/0043640 A1* | 2/2018 | Lofstrom | B64F 5/10 |
| 2019/0153994 A1* | 5/2019 | Tobin | B29C 64/393 |
| 2019/0344546 A1* | 11/2019 | Hesek | B29C 43/3642 |
| 2021/0078277 A1* | 3/2021 | Jespersen | B29D 99/0028 |

* cited by examiner

ASSEMBLY FIXTURE FOR A MODULAR ROTOR BLADE

FIELD

The present subject matter relates generally to wind turbines, and more particularly to segmented rotor blades for wind turbines and methods of joining same using one or more internal bladders.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles and transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, opposing spar caps, and one or more shear webs extending between the opposing spar caps. The skin is typically manufactured from layers of fiber composite and a lightweight core material and forms the exterior aerodynamic airfoil shape of the rotor blade. Further, the spar caps provide increased rotor blade strength by providing structural elements along the span of the rotor blade on both interior sides of the rotor blade. Moreover, spar caps are typically constructed from glass fiber reinforced composites, though spar caps for some larger blades may be constructed from carbon fiber reinforced composites. The shear web(s) generally include structural beam-like components that extend essentially perpendicular between the opposing spar caps and across the interior portion of the rotor blade between the outer skins.

The size, shape, and/or weight of rotor blades are factors that contribute to energy efficiencies of wind turbines. An increase in rotor blade size increases the energy production of a wind turbine, while a decrease in weight also furthers the efficiency of a wind turbine. Furthermore, as the size of wind turbines increases, particularly the size of the rotor blades, so do the respective costs of manufacturing, transporting, and assembly of the wind turbines. The economic benefits of increased wind turbine sizes must be weighed against these factors.

One known strategy for reducing the costs of pre-forming, transporting, and erecting wind turbines having rotor blades of increasing sizes is to manufacture the rotor blades in blade segments. As such, the blade segments may be assembled to form the rotor blade after, for example, the individual blade segments are transported to an erection location. For example, some rotor blades include either bonded or bolted joints. One such bolted joint includes a chord-wise extending pin securing a male shear web member or spar member within a female shear web member so as to join adjacent blade segments.

Various structural bonds may be used to join blade segments. For example, elements of the structural 'I' beam, such as the skins of the shear web and the spar caps, may be used to join blade segments. Further, fasteners may be used to join longitudinal bulkheads and/or similar structures. Moreover, the outer skin and/or aerodynamic fairings may be joined using a shell-to-shell connection.

In addition, the outer skin typically forms the exterior aerodynamic airfoil shape of the rotor blade. In some turbine blades, the outer skin does not form a complete enclosure. More specifically, gaps and spaces may be left between the blade segments. As such, aerodynamic fairings can be used to cover the gaps and/or spaces between the blade segments to reduce form drag and interference drag. Such fairings may also improve the performance of the turbine blade. Moreover, the fairings can be joined together and/or to the outer skin using shell-to-shell connections. Further rotor blades may also include leading edge caps for protecting the leading edge of the rotor blade.

A number of challenges may be involved in achieving the aforementioned connections, particularly with the outer skin bond and/or obtaining the required tolerances. For example, the outer skin may be joined along scarf joints using adhesives, thermoplastics, and/or pre-preg film. Such methods often require internal and external pressures applied at the joint simultaneously, such as a clamp. Such pressures maintain segments together and can allow for the formation of a strong bond at the joint.

The internal pressure, however, can be difficult to achieve and maintain on the mating surfaces during the bond process. Structural requirements must also be considered, such as, adequate transfer of the load. For example, the joint should be able to successfully transfer the load across the inner and outer skins on either side of the structural core. In addition, the surface bonds and sub-component bonds must be accurately aligned with smooth transitions to ensure suitable aerodynamic shape and performance.

Accordingly, the art is continuously seeking new and improved technologies for joining blade segments of rotor blades.

BRIEF DESCRIPTION

Aspects and advantages of the invention will be set forth in part in the following description, or may be obvious from the description, or may be learned through practice of the invention.

In an aspect, the present disclosure is directed to a method for joining rotor blade segments of a rotor blade. The method includes placing a first blade segment in an assembly fixture. The assembly fixture has an outer carrier and at least one bladder arranged with the outer carrier. The first blade segment has an adhesive applied at one or more locations. The method also includes arranging the first blade segment with a second blade segment at at least one joint using the assembly fixture with the adhesive positioned at the at least one joint. Further, the method includes inflating the at least one bladder to provide pressure to the at least one joint, wherein the pressure causes the adhesive to displace between the first and second blade segments at the at least one joint, thereby securing the first and second blade segments together at the at least one joint. Moreover, the method includes maintaining the pressure via the at least one inflated bladder to allow the adhesive to cure, thereby securing the first and second blade segments together.

In another aspect, the present disclosure is directed to an assembly fixture for securing rotor blade segments at a joint of a rotor blade. The assembly fixture includes a rigid outer carrier, an adjustable inner carrier arranged within the outer carrier, and at least one bladder arranged with the outer carrier. Thus, upon inflating the at least one bladder, the at least one bladder provides pressure to the joint and adhesive at the joint secures the rotor blade segments together at the joint.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
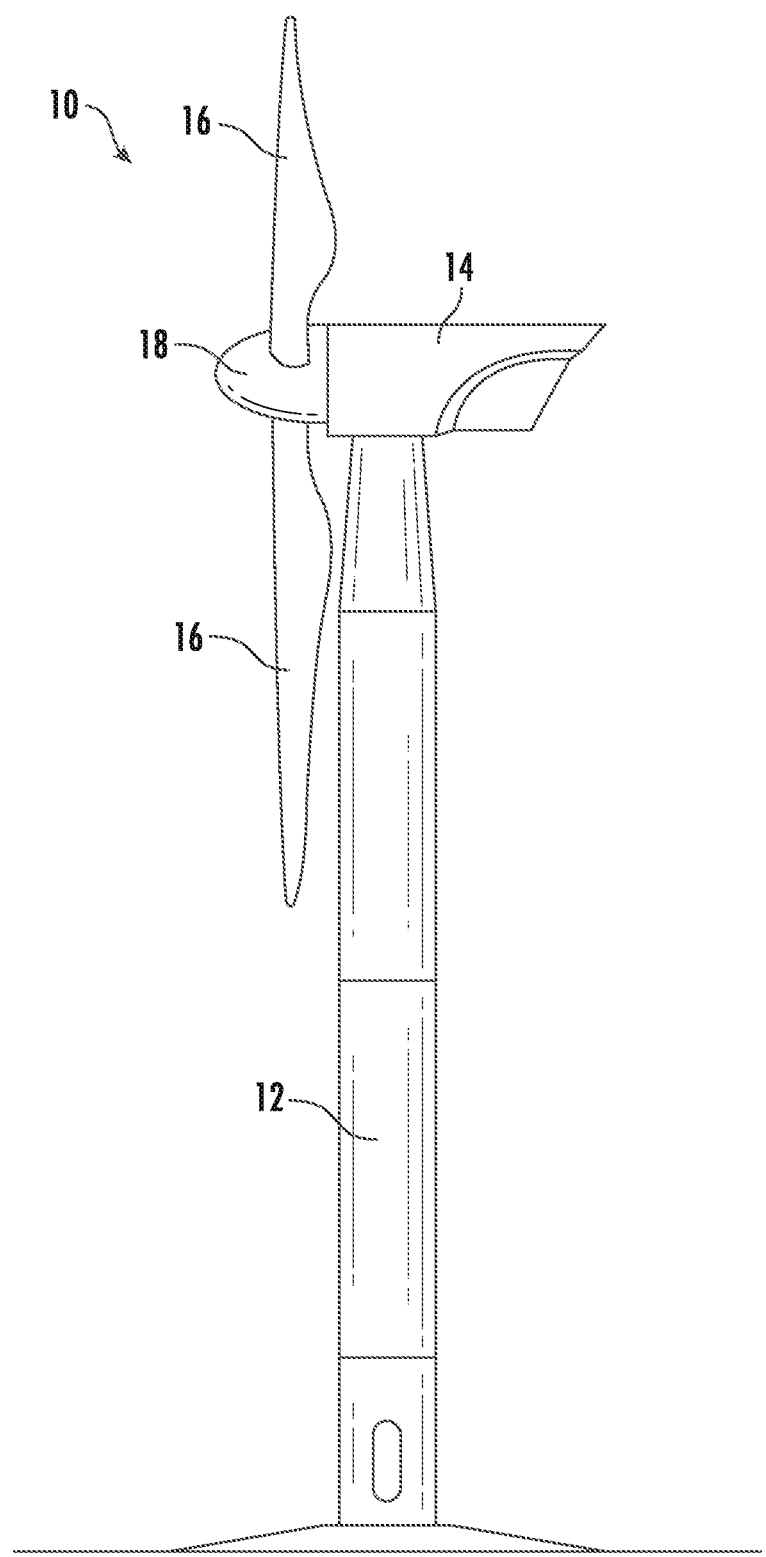
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a segmented rotor blade for a wind turbine and methods of manufacturing the same. For example, in one embodiment, the method includes placing a first blade segment in an assembly fixture. The assembly fixture has an outer carrier, an inner carrier (e.g., such as a flexible inner carrier or one or more suction cups), and at least one bladder arranged with the outer carrier. The method also includes arranging the first blade segment with a second blade segment at at least one joint using the assembly fixture, wherein an adhesive is positioned at the joint(s). In an embodiment, the adhesive may be applied at one or more locations on the first blade segment. In another embodiment, the adhesive may be applied to the second blade segment. The method further includes inflating the bladder(s) to provide pressure to the joint(s). As such, the pressure causes the adhesive to displace between the first and second blade segments at the joint(s), thereby securing the first and second blade segments together at the joint(s). In an embodiment, for example, the inflated bladder(s) are configured to deflect the flexible inner carrier towards the joint(s) to disperse the adhesive between the first and second blade segments. In another embodiment, the inner carrier may be one or more section cups, in which case, the suction cup(s) secure the first blade segment to the outer carrier via vacuum that is released when the bladder(s) are inflated to provide the desired pressure at the joint(s). Moreover, the method includes maintaining the pressure via the inflated bladder to allow the adhesive to cure, thereby securing the first and second blade segments together. In another embodiment, the inner carrier may function as an alignment tool, since the first blade segment may be in contact with the inner carrier and the inner carrier is pressed against the outer carrier. This results in proper alignment without the need for costly and/or additional equipment. In addition, the inner carrier, when the pressure is applied, may reach to the desired final geometry to ensure proper alignment. In certain embodiments, the first blade segment, which may be a leading edge cap, can be manufactured in a sprung-out geometry, such that the cap needs to be pushed inwards to meet the desired geometry.

It should be appreciated that, although the present subject matter will generally be described herein with reference to components of a wind turbine, the disclosed method may be generally used to bond any two or more composite parts along a joint.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
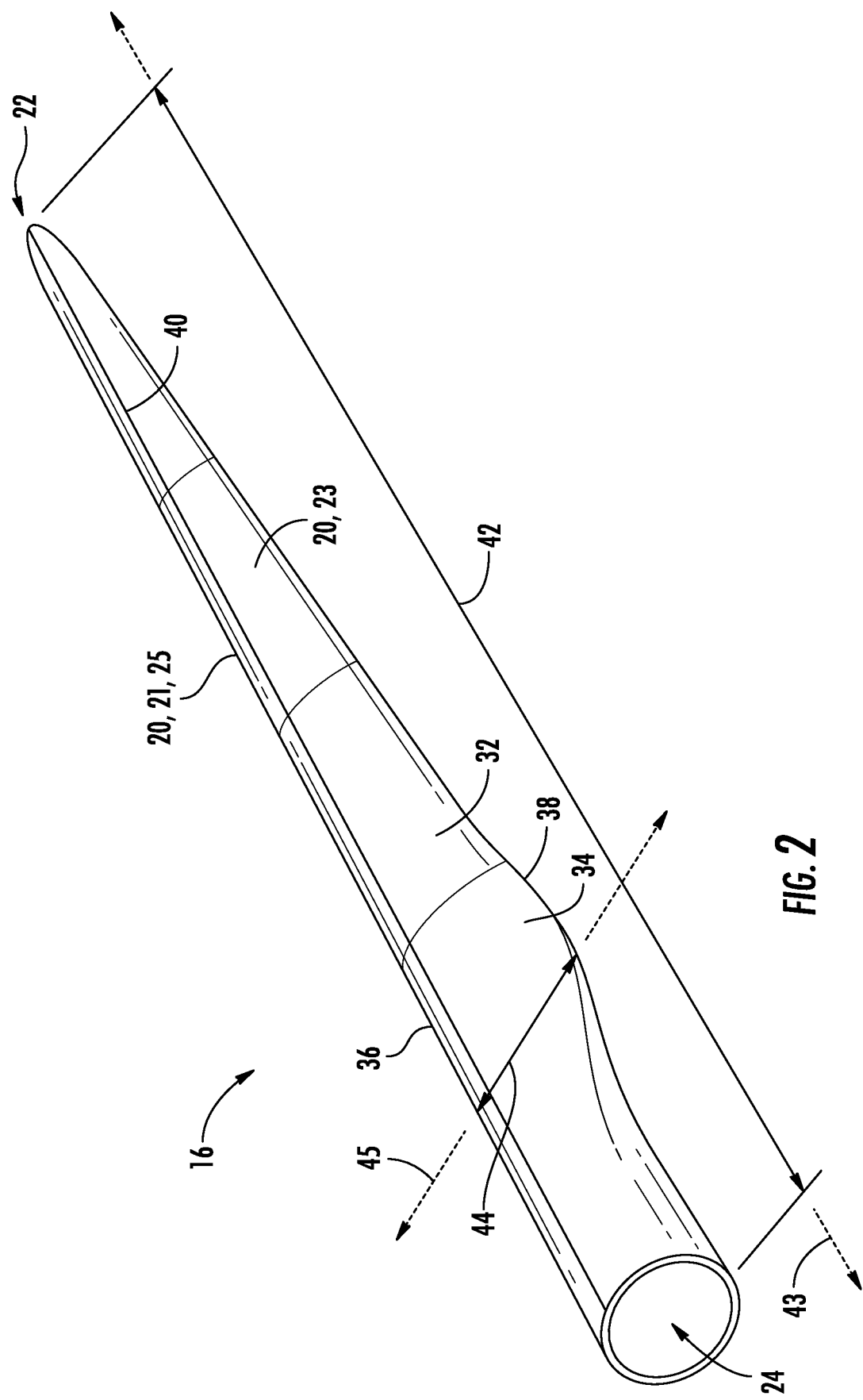
FIG. 2 illustrates a perspective view of one of the rotor blades of FIG. 1.

Referring now to FIG. 2, a perspective view of one embodiment of a rotor blade 16 of the wind turbine 10 of FIG. 1 according to the present disclosure is shown. As shown, the rotor blade 16 may include a plurality of individual blade segments 20 aligned in an end-to-end or side-by-side configuration from a blade tip 22 to a blade root 24. Further, as shown, each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16. As such, the rotor blade 16 may include any suitable number of segments 20. For example, as shown, the rotor blade 16 includes three rotor blade segments 20. It should be understood, however, that the rotor blade 16 may have any suitable number of blade segments 20, such as less than three or more than three, such as four or more.

In general, the rotor blade 16 may include a pressure side 32 and a suction side 34 extending between a leading edge 36 and a trailing edge 38. Additionally, the rotor blade 16 may have a span 42 extending along a span-wise axis 43 and a chord 44 extending along a chord-wise axis 45. Further, as shown, the chord 44 may change throughout the span 42 of the rotor blade 16. Thus, a local chord may be defined at any span-wise location on the rotor blade 16 or any blade segment 20 thereof.

The rotor blade 16 may, in exemplary embodiments, be curved. Curving of the rotor blade 16 may entail bending the rotor blade 16 in a generally flapwise direction and/or in a generally edgewise direction. The flapwise direction is a direction substantially perpendicular to a transverse axis through a cross-section of the widest side of the rotor blade 16. Alternatively, the flapwise direction may be construed as the direction (or the opposite direction) in which the aerodynamic lift acts on the rotor blade 16. The edgewise direction is perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Figure 3:
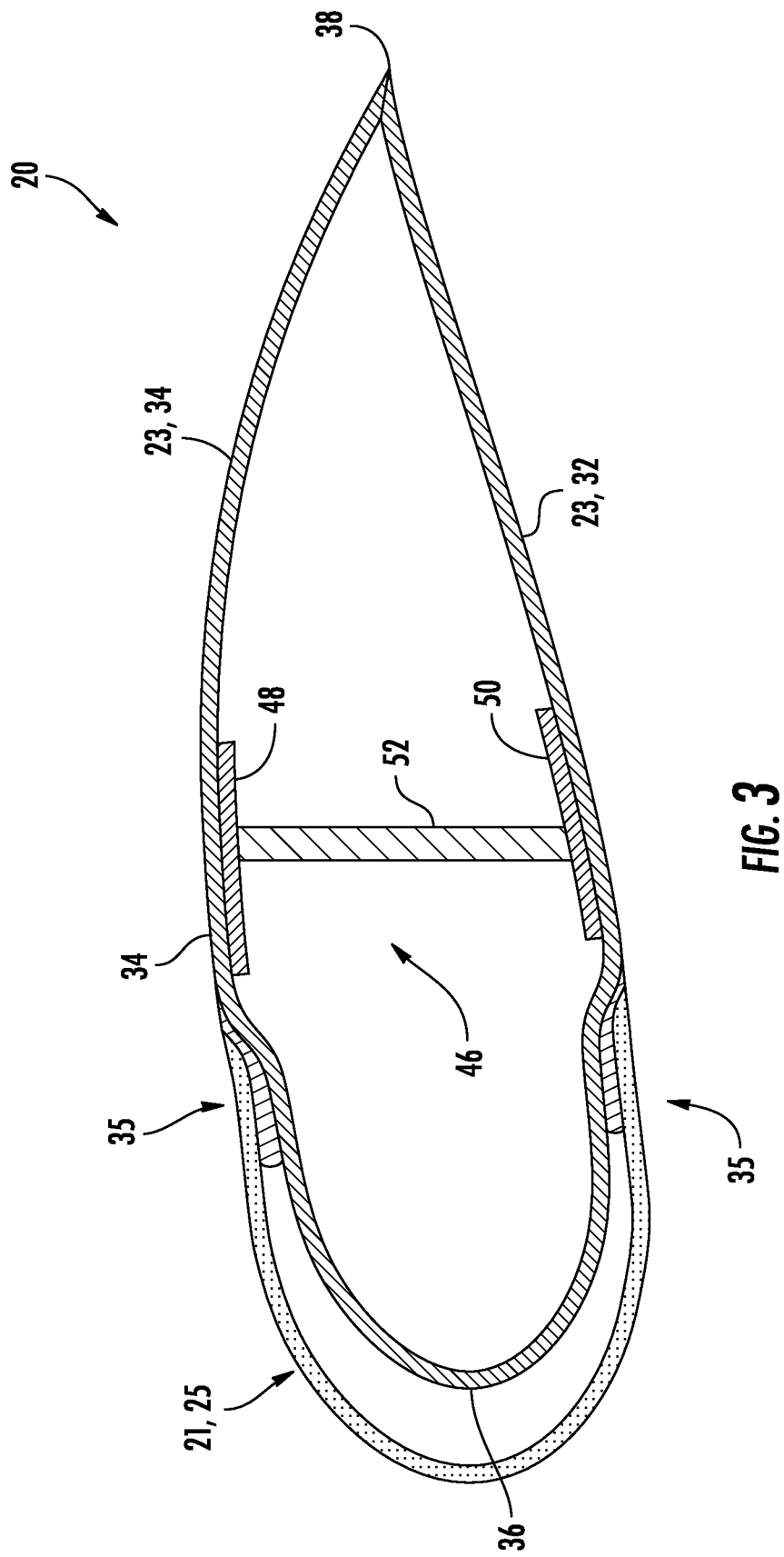
FIG. 3 illustrates a cross-sectional view of an embodiment of a segmented rotor blade according to the present disclosure.

In exemplary embodiments, and as discussed in detail below, the rotor blade segments 20 may be joined together through a joint 40 as further described herein below. Furthermore, as shown in FIGS. 2 and 3, the blade segments 20 may include, at least, a first blade segment 21 and a second blade segment 23. Further, as shown, the first blade segment 21 may include, for example, a leading edge cap 25. Moreover, as shown, the second blade segment 23 may include a pressure side surface 32 or a suction side surface 34. Further, as shown in FIG. 3, the rotor blade 16 may include one or more structural components, such as a beam structure 46 that includes spar caps 48, 50 on either or both of the pressure or suction sides 32, 34 of the rotor blade 16. In addition, the rotor blade 16 may also include one or more shear webs 52 extending between the spar caps 48, 50. It should be understood that although a beam configuration is shown, any other suitable structural configuration may also be included in the rotor blade 16.

Figure 4:
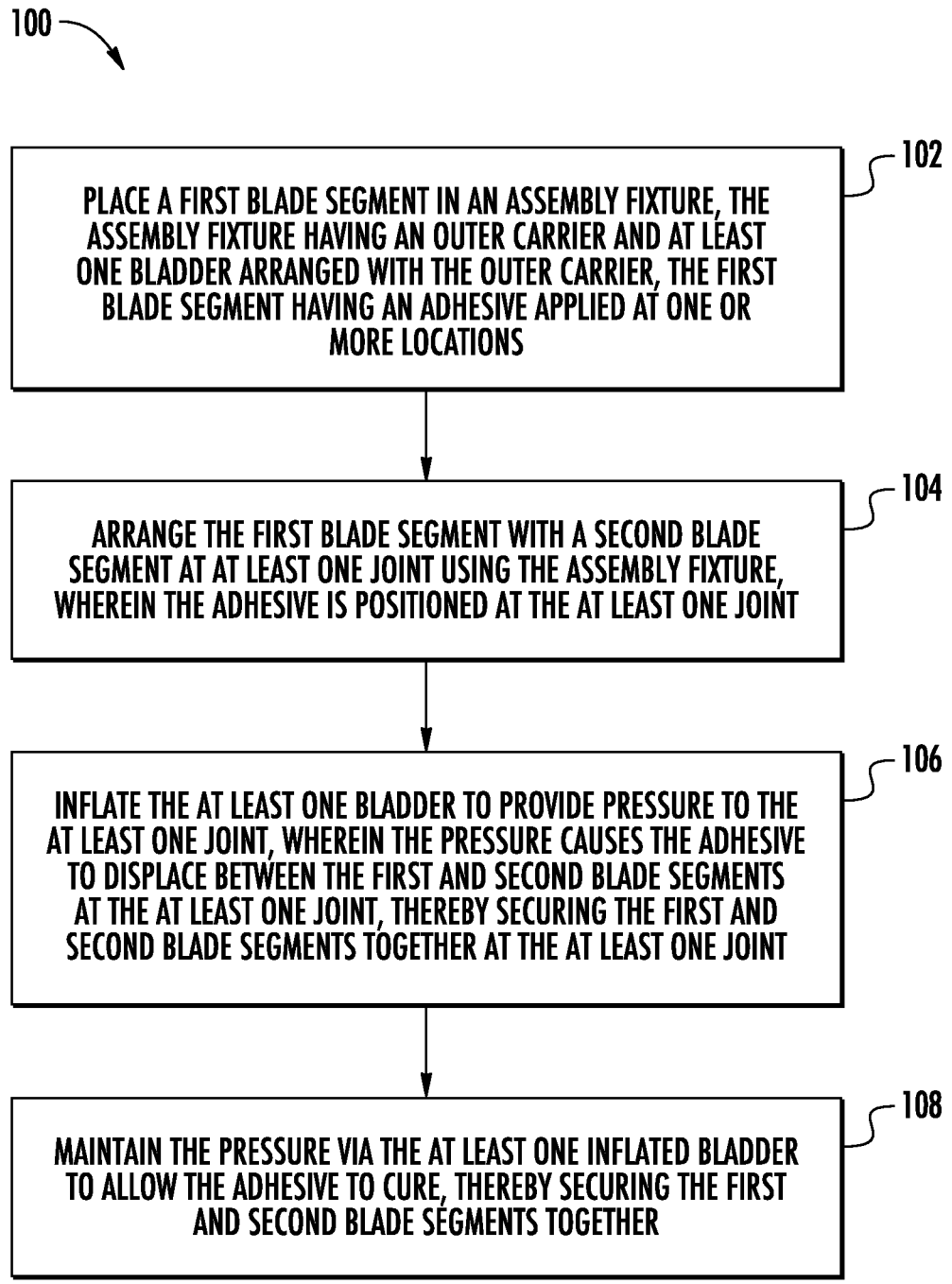
FIG. 4 illustrates a flow diagram of one embodiment of a method for joining rotor blade segments of a rotor blade according to the present disclosure.
Figure 5:
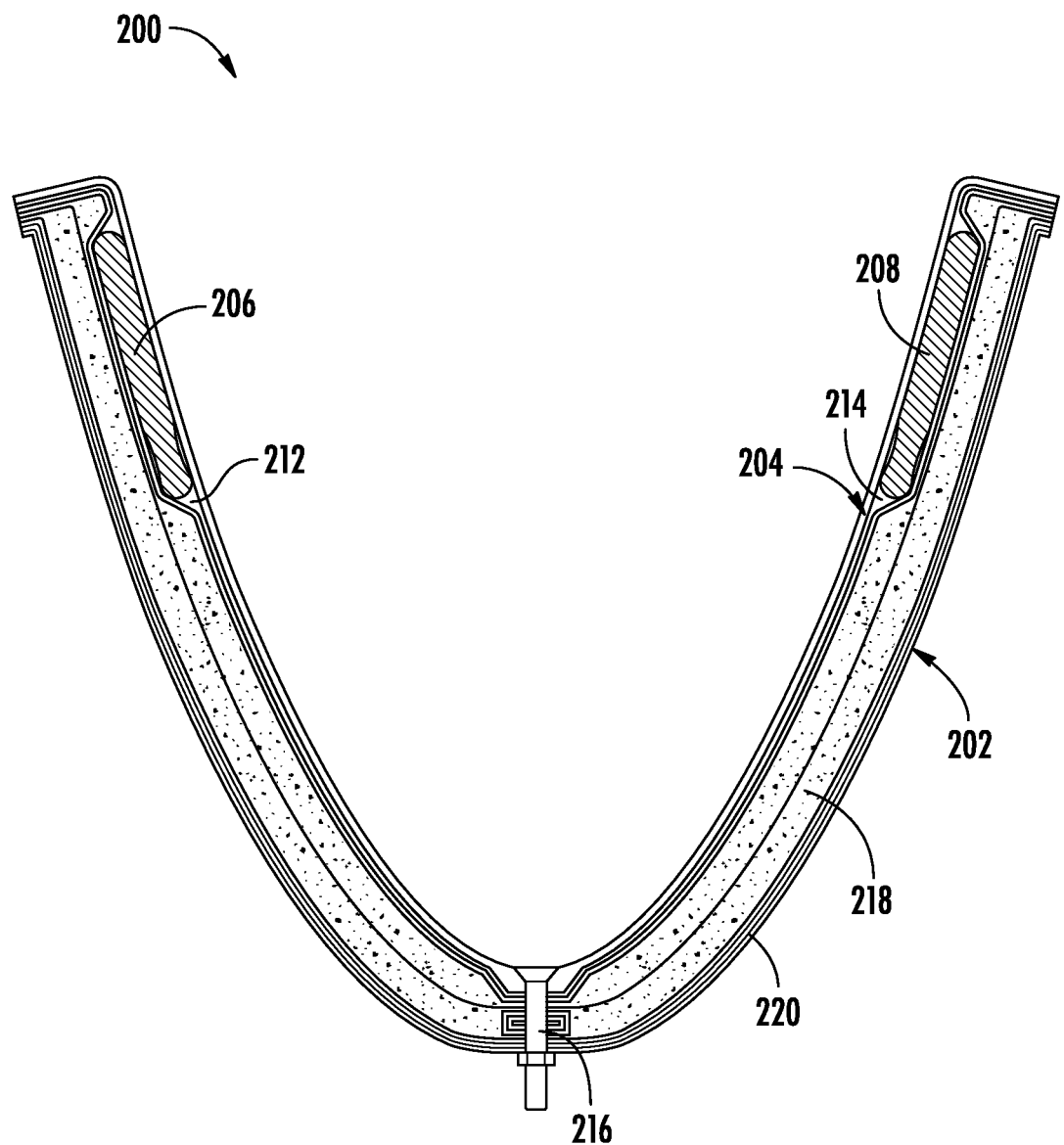
FIG. 5 illustrates a front view of an embodiment of an assembly fixture for securing rotor blade segments at a joint of a rotor blade according to the present disclosure.

Referring now to FIG. 4, the present disclosure is also directed to methods for joining the rotor blade segments 20 of the rotor blade 16. For example, as shown in FIG. 4, a flow diagram of one embodiment of a method 100 for joining rotor blade segments 20 of the rotor blade 16 is illustrated. In general, the method 100 is described herein as relating to joining wind turbine rotor blades. However, it should be appreciated that the disclosed method 100 may be implemented using any other suitable rotor blades now known or later developed in the art and is also not limited to wind turbines. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes placing a first blade segment in an assembly fixture. As will be discussed in more detail herein, the assembly fixture includes an outer carrier, an inner carrier, and at least one bladder arranged between the inner and outer carriers. Furthermore, the first blade segment has an adhesive applied at one or more locations. As shown at (104), the method 100 includes arranging the first blade segment with a second blade segment at at least one joint using the assembly fixture, wherein the adhesive is positioned at the at least one joint. As shown at (106), the method 100 includes inflating the at least one bladder arranged between the inner and outer carriers to deflect the inner carrier towards the at least one joint so as to provide pressure to the at least one joint, wherein the pressure causes the adhesive to displace between the first and second blade segments at the at least one joint, thereby securing the first and second blade segments together at the at least one joint. Further, as shown at (108), the method 100 includes maintaining the pressure via the at least one bladder inflated bladder to allow the adhesive to cure, thereby securing the first and second blade segments together.

Figure 6:
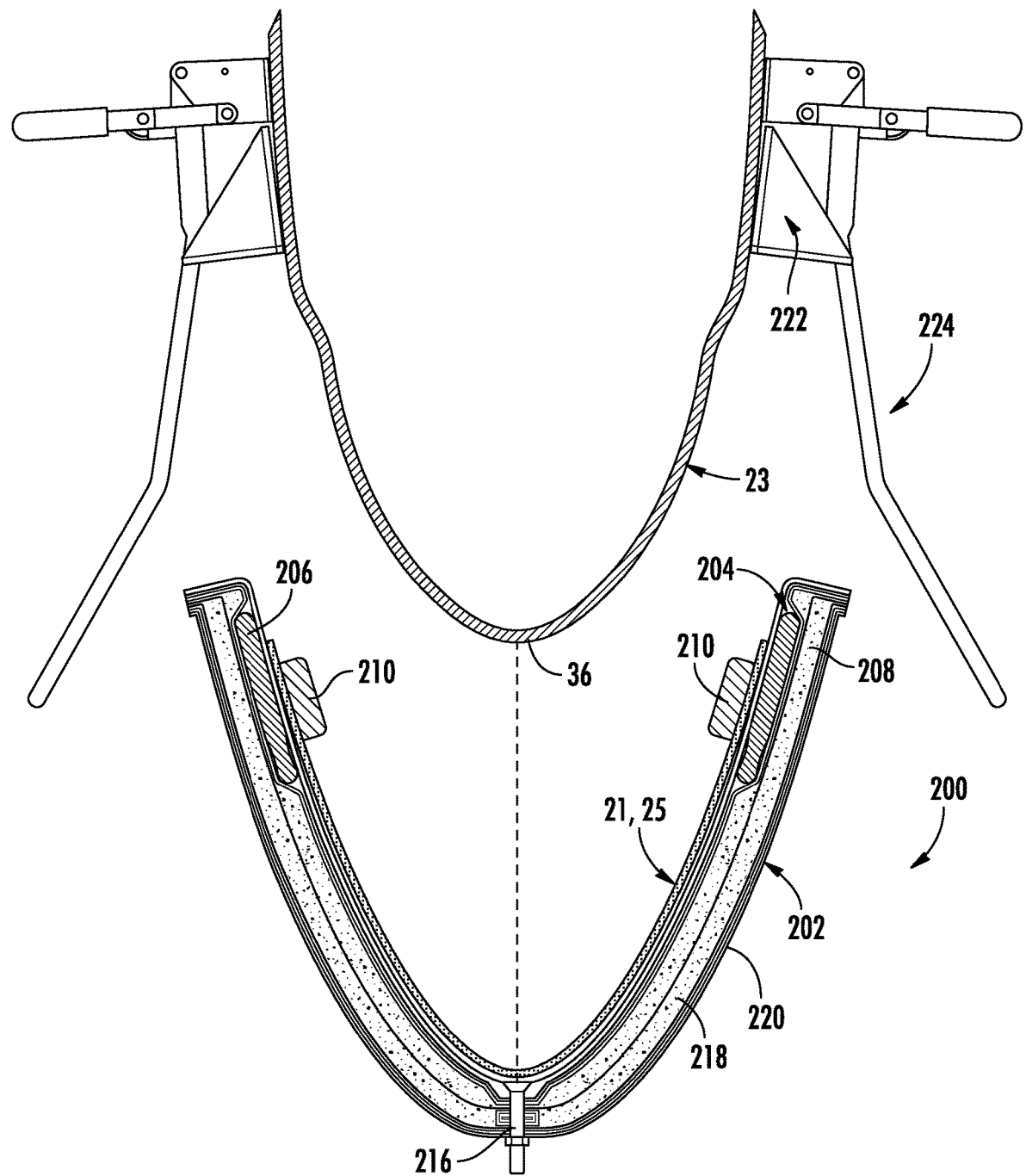
FIG. 6 illustrates a front view of an embodiment of an assembly fixture for securing rotor blade segments at a joint of a rotor blade according to the present disclosure, particularly illustrating a leading edge cap arranged in the assembly fixture and being aligned with a leading edge of a rotor blade.
Figure 7:
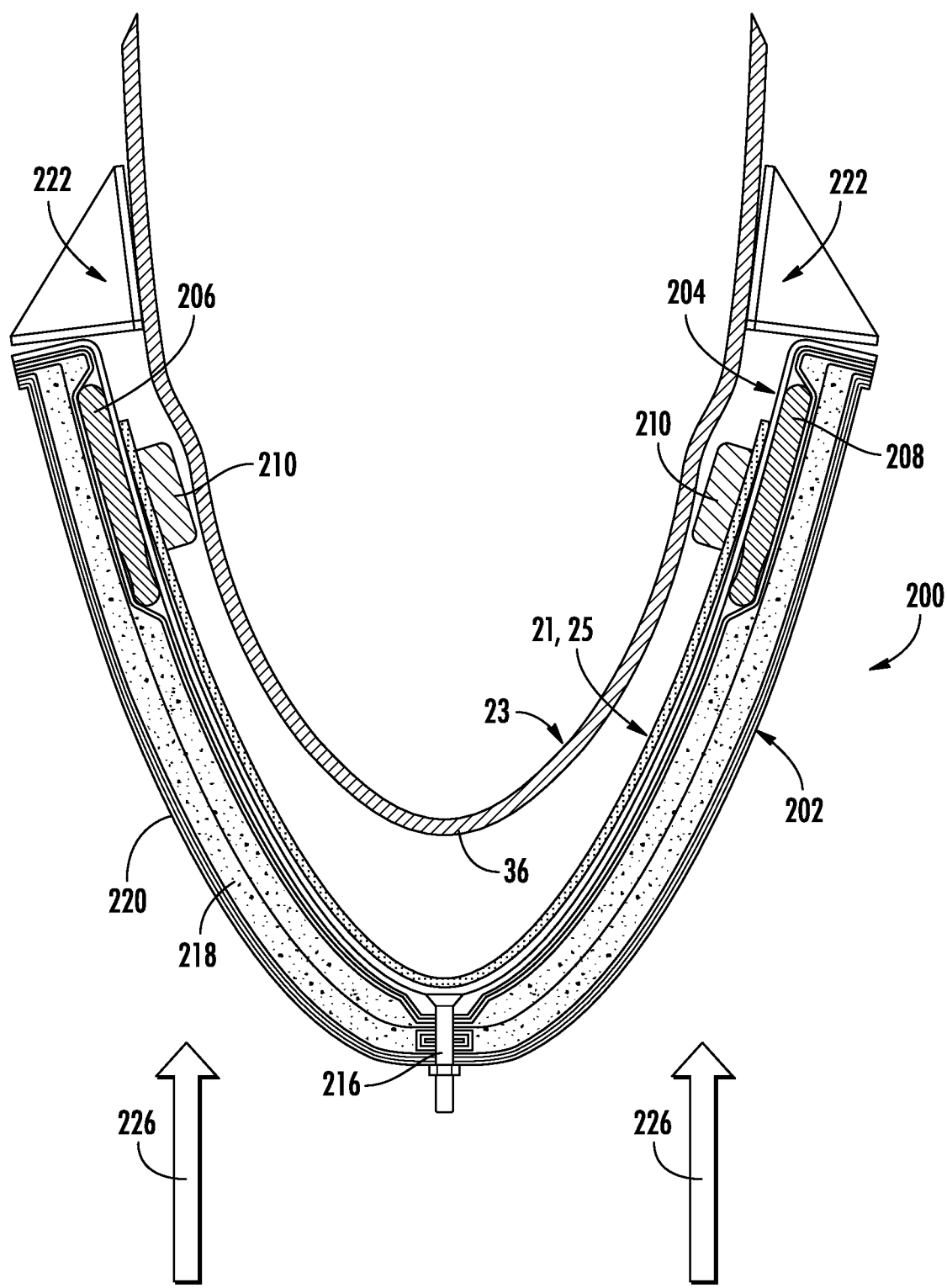
FIG. 7 illustrates a front view of an embodiment of an assembly fixture for securing rotor blade segments at a joint of a rotor blade according to the present disclosure, particularly illustrating a leading edge cap arranged in the assembly fixture and aligned with a leading edge of a rotor blade via bump stops.
Figure 8:
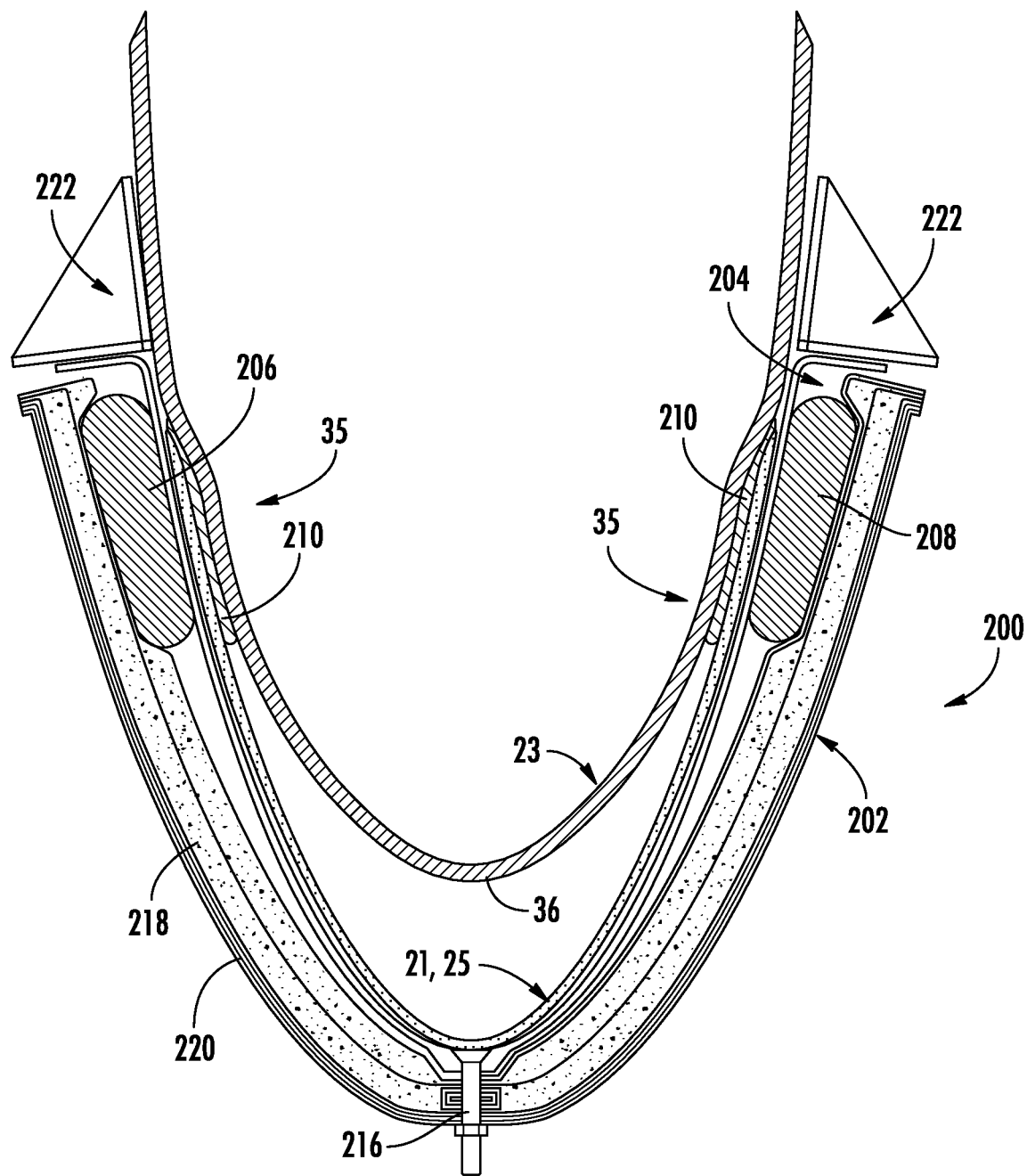
FIG. 8 illustrates a front view of an embodiment of an assembly fixture for securing rotor blade segments at a joint of a rotor blade according to the present disclosure, particularly illustrating a leading edge cap arranged in the assembly fixture and being secured to a leading edge of a rotor blade via inflatable bladders that displaced adhesive at a joint between the leading edge cap and the leading edge.

The method 100 of FIG. 4 can be better understood with reference to FIGS. 5-12. In particular, FIGS. 5-12 illustrate various views of an embodiment of an assembly fixture 200 for securing rotor blade segments, such as blade segments 21, 23 at a joint of a rotor blade, such joint 35 of rotor blade 16 in FIG. 3, according to the present disclosure. In particular, as shown in FIGS. 5-9, the assembly fixture 200 includes a rigid outer carrier 202 and a flexible inner carrier 204 arranged within the outer carrier 202. As such, in an embodiment, as shown in FIG. 8, the inner carrier 204 is configured to deflect away from the outer carrier 202 as will be explained in more detail herein below. In addition, as shown in FIGS. 5-9, the rigid outer carrier 202 may be constructed, for example, using a core material 218 infused together with one or more skins 220. Thus, the rigid outer carrier 202 is configured to maintain its shape throughout use and to provide span wise stiffness and/or torsional stiffness. Moreover, as shown, the inner carrier 204 may be secured to the outer carrier 202, for example, via one or more fasteners 216. Thus, such securement is configured to maintain alignment of the inner carrier 204 with respect to the outer carrier 202.

For example, as shown in FIGS. 5-9, the assembly fixture 200 includes at least one bladder 206, 208 arranged between the inner and outer carriers 202, 204. In particular embodiments, as shown, the assembly fixture 200 may include a first bladder 206 and a second bladder 208 arranged on opposite sides of the assembly fixture 200. More particularly, as shown, the bladder(s) 206, 208 may be arranged within a recess 212, 214 of the outer carrier 202. For example, as shown, the first and second bladders 206, 208 may be arranged within respective recesses 212, 214 on opposing sides of the assembly fixture 200. Thus, in such embodiments, the rigidity of the outer carrier 202 may be such that, when the bladders 206, 208 are inflated as described herein, the outer carrier 202 provides enough support to inflate the bladders 206, 208.

In an embodiment, the bladder(s) 206, 208 of the present disclosure may be formed from plastic, aerospace-type films, silicone, or similar. As such, the assembly fixture 200 orients the bladder(s) 206, 208 in proximity to its desired location at the joint 35. In certain embodiments, for example, such placement can remove the necessity of using high pressure to inflate the bladder(s) 206, 208, allowing a thinner walled, lighter bladder.

Moreover, as shown in FIGS. 6 and 7, the first blade segment 21 may be placed into the assembly fixture 200. In such embodiments, as shown, the first blade segment 21 may be placed into the assembly fixture 200 with adhesive 210 applied thereto. Thus, as shown in FIGS. 6-11, the first blade segment 21 may be arranged with the second blade segment 23 at the joint 35 using the assembly fixture 200. More specifically, as shown in FIGS. 6-11, the second blade segment 23 may be arranged above the first blade segment 21.

Figure 10:
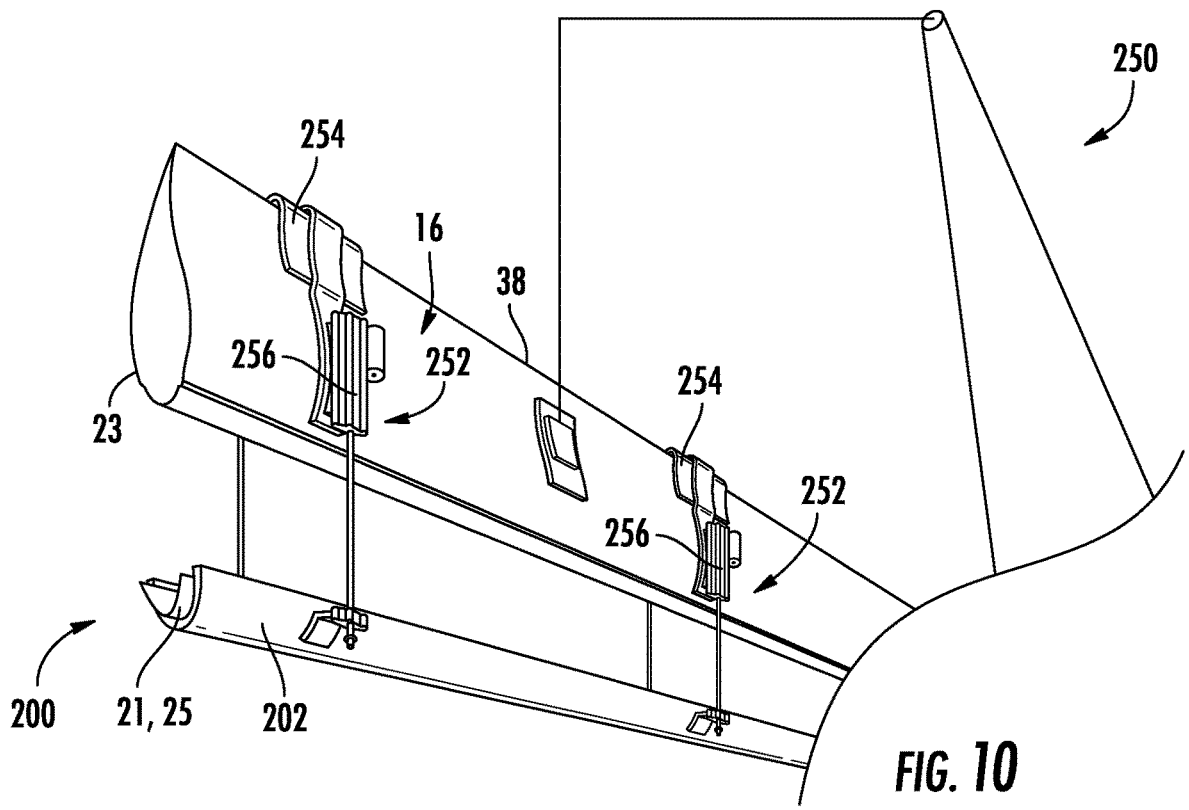
FIG. 10 illustrates a partial, perspective view of an embodiment of an assembly fixture for securing rotor blade segments at a joint of a rotor blade according to the present disclosure, particularly illustrating the assembly fixture secured to the rotor blade via a lifting assembly, with the assembly fixture spaced apart from the leading edge of the rotor blade so as to receive a leading edge cap therein.
Figure 11:
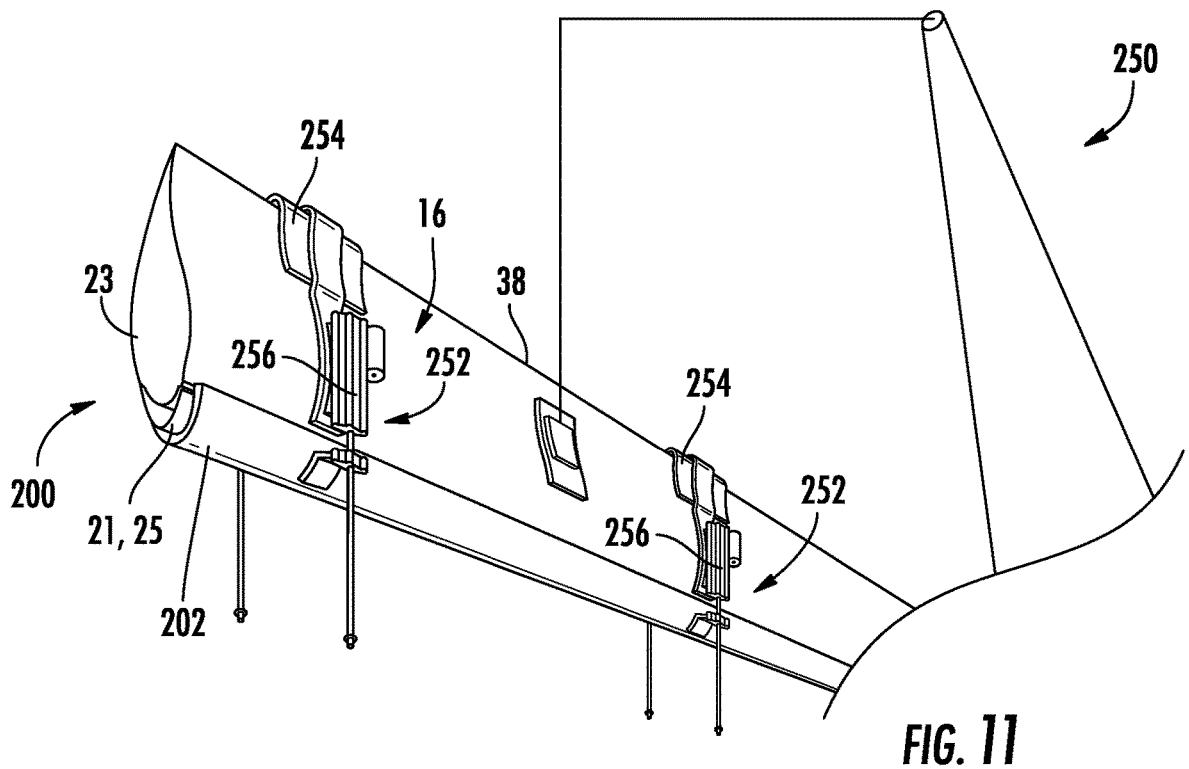
FIG. 11 illustrates a partial, perspective view of an embodiment of an assembly fixture for securing rotor blade segments at a joint of a rotor blade according to the present disclosure, particularly illustrating the assembly fixture secured to the rotor blade via a lifting assembly, with the assembly fixture lifted up to the leading edge of the rotor blade for securing the leading edge cap thereto.
Figure 12:
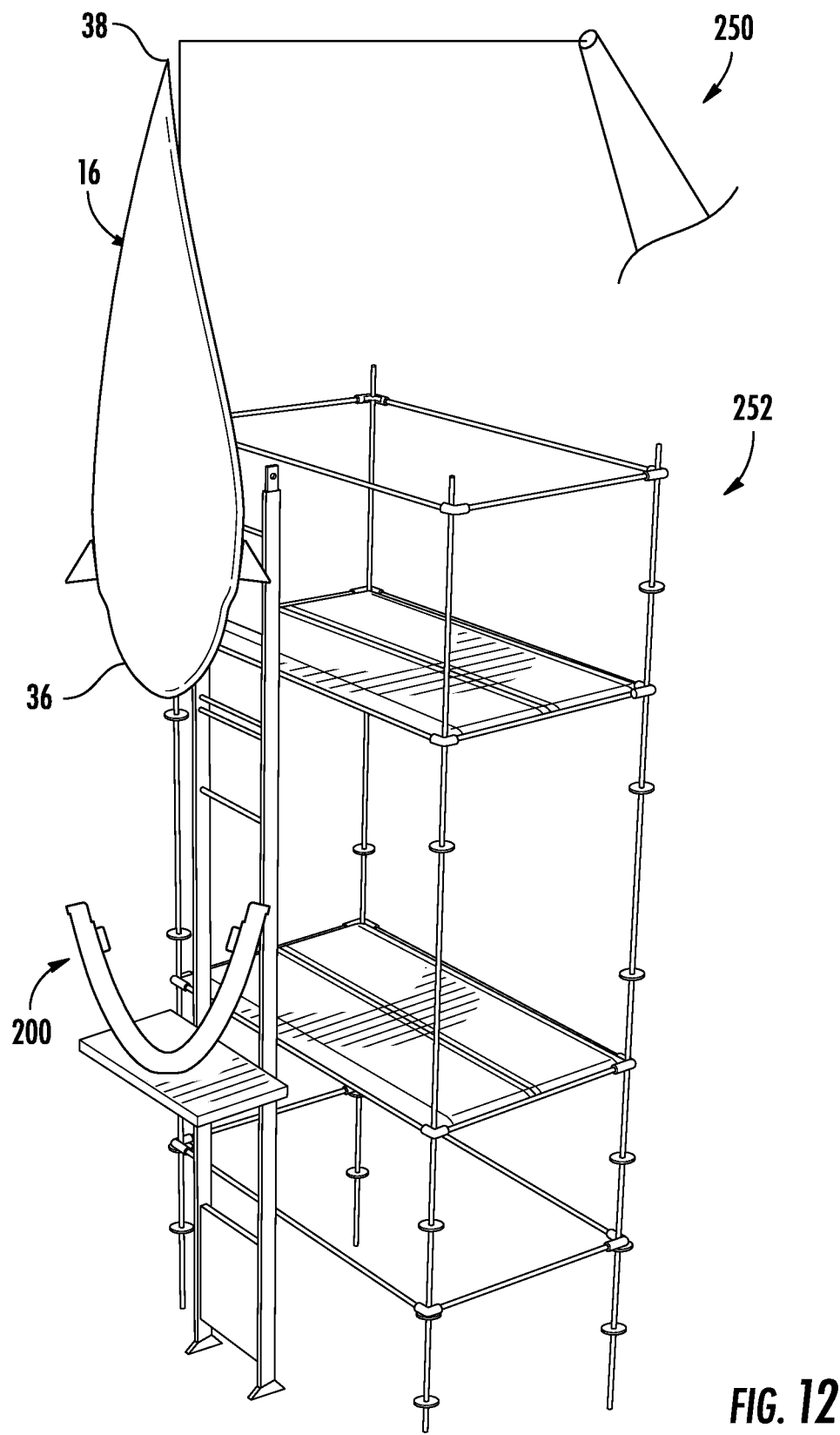
FIG. 12 illustrates a perspective view of an embodiment of a lifting assembly for an assembly fixture for securing rotor blade segments at a joint of a rotor blade according to the present disclosure.

In such embodiments, as shown in FIGS. 10-12, the second blade segment 23 may be secured in place with respect to the first blade segment 21 (such as above the first blade segment 21) using, for example, a first lifting assembly 250. In such embodiments, the first lifting assembly 250 may be a crane, forklift, lift, etc. Furthermore, in an embodiment, as shown in FIGS. 10-12, the assembly fixture 200 containing the first blade segment 21 can be lifted up to the second blade segment 23 to arrange the first blade segment 21 with the second blade segment 23 using, e.g., a second lifting assembly 252. For example, as shown in FIGS. 10 and 11, the second lifting assembly 252 may include at least one trailing edge protector 254 secured to the trailing edge 38 of the second blade segment 23. In particular, as shown, the second lifting assembly 252 includes two trailing edge protectors 254 spaced apart along the trailing edge 38 of the second blade segment 23. In further embodiments, any number of trailing edge protectors 254 may be placed along the length of the trailing edge 38. Further, as shown, the second lifting assembly 252 may include a lifting apparatus 256 secured to each of the trailing edge protectors 254 for lifting the assembly fixture 200 containing the first blade segment 21 up to the second blade segment 23. Thus, in an embodiment, the lifting apparatus 256 may include a hydraulic system (FIGS. 10 and 11), an actuator system, a lift (FIG. 12), or any other suitable lifting assembly.

Referring particularly to FIGS. 6 and 7, the assembly fixture 200 may also include one or more bump stops 222 and/or one or more guide rails 224. In particular, as shown, the bump stop(s) 222 and guide rail(s) 224 are configured to assist with arranging the first blade segment 21 with the second blade segment 23 at the joint 35. In such embodiments, as shown, the bump stop(s) 222 may be temporarily placed on or otherwise secured to the second blade segment 23 using e.g., vacuum, temporary bonding, pressure, etc. Moreover, as shown, the guide rail(s) 224 may also be secure to the second blade segment 23, for example, by being secured to the bump stop(s) 222. Accordingly, as shown, the assembly fixture 200 containing the first blade segment 21 can be lifted up to the second blade segment 23 (as indicated by arrows 226) until the bump stop(s) 222 contact the assembly fixture 200 to arrange the first blade segment 21 with the second blade segment 23 at the joint 35. Furthermore, the first and second blade segments 21, 23 can be aligned together using the guide rail(s) 224.

Referring particularly to FIG. 8, once the first and second blade segments 21, 23 are aligned together using the assembly fixture 200, the inflatable the bladder(s) 206, 208 can be inflated. Thus, upon inflating the bladder(s) 206, 208 arranged between the inner and outer carriers 202, 204 of the assembly fixture 200 (as shown in FIG. 8), the flexible inner carrier 204 deflects away from the rigid outer carrier 202 and towards the joint 35 so as to provide pressure to the joint 35. Accordingly, in an embodiment, as shown, the pressure causes the adhesive 210 at the joint 35 to displace between the rotor blade segments 21, 23 at the joint 35, thereby securing the rotor blade segments 21, 23 together at the joint 35. In an embodiment, the pressure applied by the bladder(s) 206, 208 ranges from about 0.25 pounds per square inch (psi) to about 20 psi, such as about one (1) psi to about fifteen (15) psi. In another embodiment, pressure may be applied via the bladder(s) 206, 208 ranging from about one (1) to about (3) psi, such as about two (2) to about three (3) psi.

Figure 9:
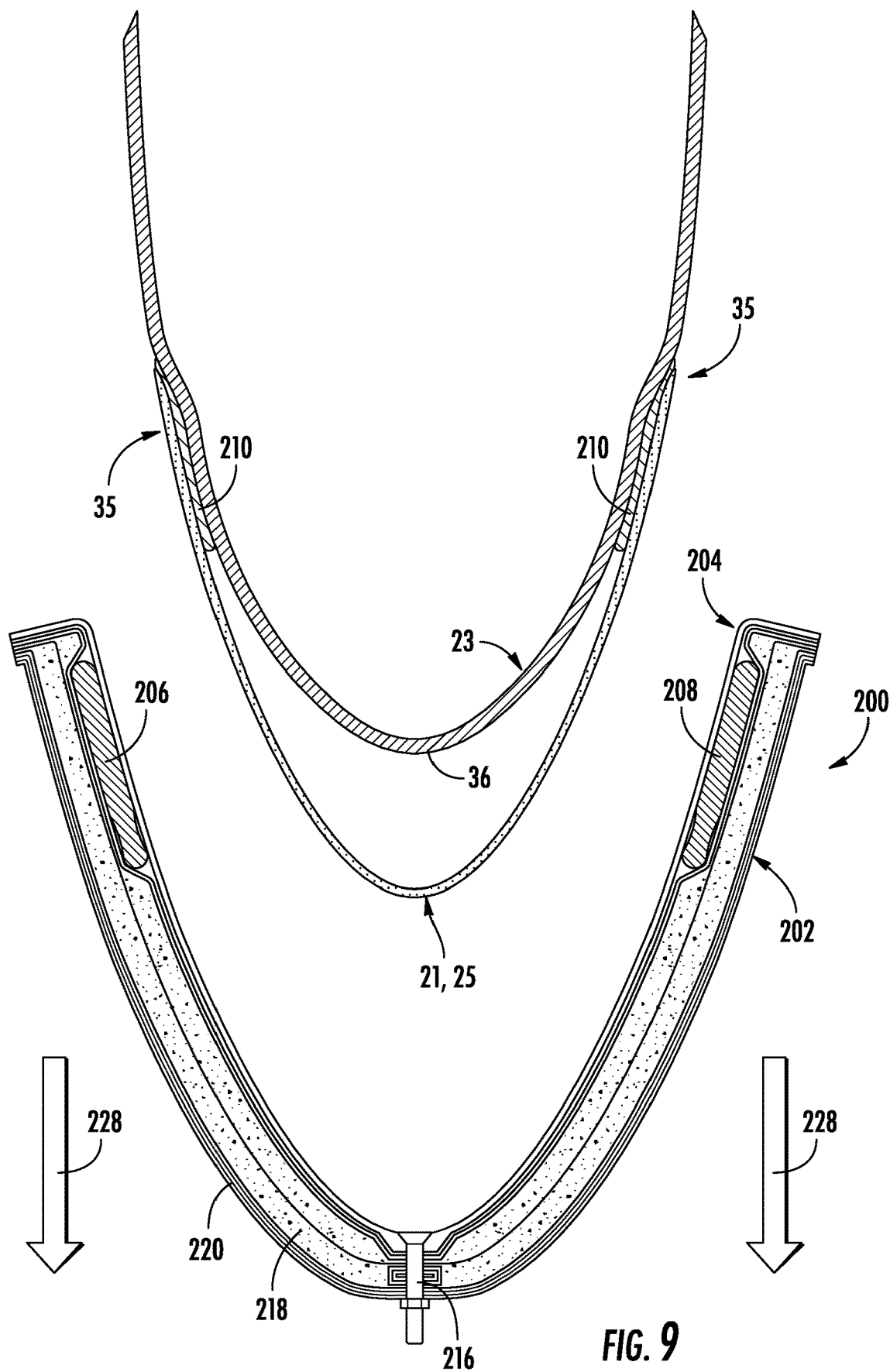
FIG. 9 illustrates a front view of an embodiment of an assembly fixture for securing rotor blade segments at a joint of a rotor blade according to the present disclosure, particularly illustrating a leading edge cap secured to a leading edge of a rotor blade and the assembly fixture being removed.

Referring now to FIG. 9, after the adhesive 210 is allowed to cure, the bladder(s) 206, 208 can be deflated and the assembly fixture 200 can be lowered as indicated by arrows 228. Further, as shown, the bump stop(s) 222 and/or the guide rail(s) 224 can be removed from the second blade segment 23. The final assembled rotor blade 16 can then be used in operation of the wind turbine 10.

Figure 13:
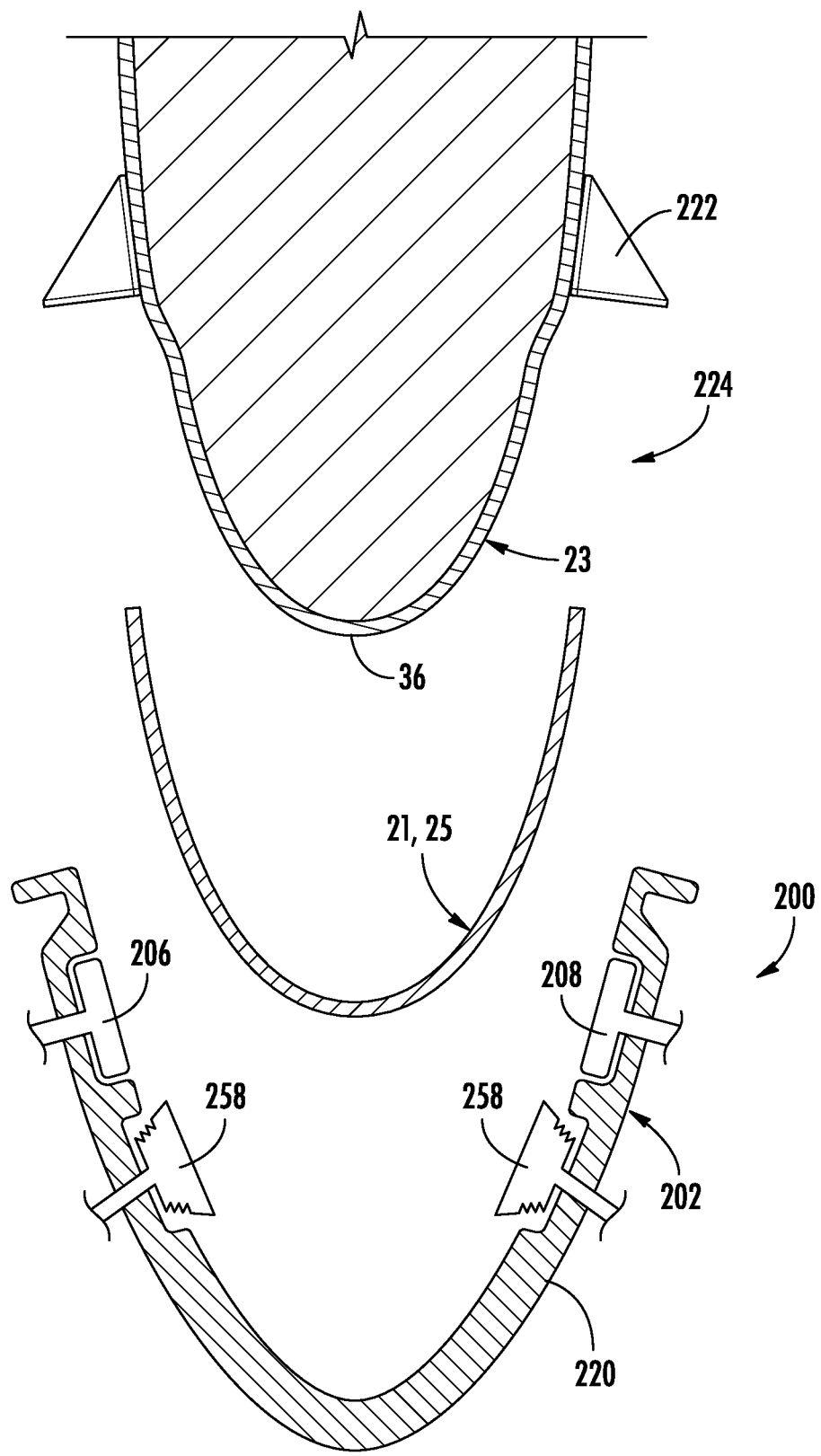
FIG. 13 illustrates an exploded view of another embodiment of an assembly fixture for securing rotor blade segments at a joint of a rotor blade according to the present disclosure.

Referring now to FIGS. 13 and 14A-14D, various views of another embodiment of an assembly fixture and related process steps for securing rotor blade segments at a joint of a rotor blade according to the present disclosure are illustrated. In particular, as shown in FIG. 13, an exploded view of the assembly fixture 200 for securing rotor blade segments at a joint of a rotor blade according to the present disclosure is illustrated, whereas FIGS. 14A-14D illustrate process steps of using the assembly fixture 200 of FIG. 13 to secure rotor blade segments together at a joint of a rotor blade according to the present disclosure.

Figure 14A:
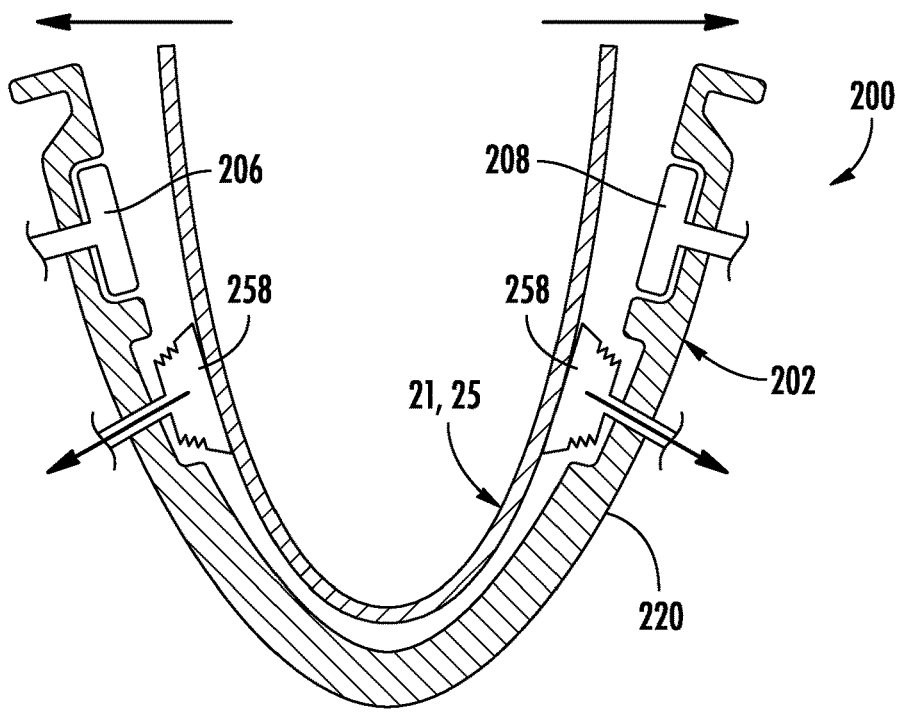
FIGS. 14A-14D illustrate process steps of an embodiment of using an assembly fixture to secure rotor blade segments together at a joint of a rotor blade according to the present disclosure.
Figure 14B:
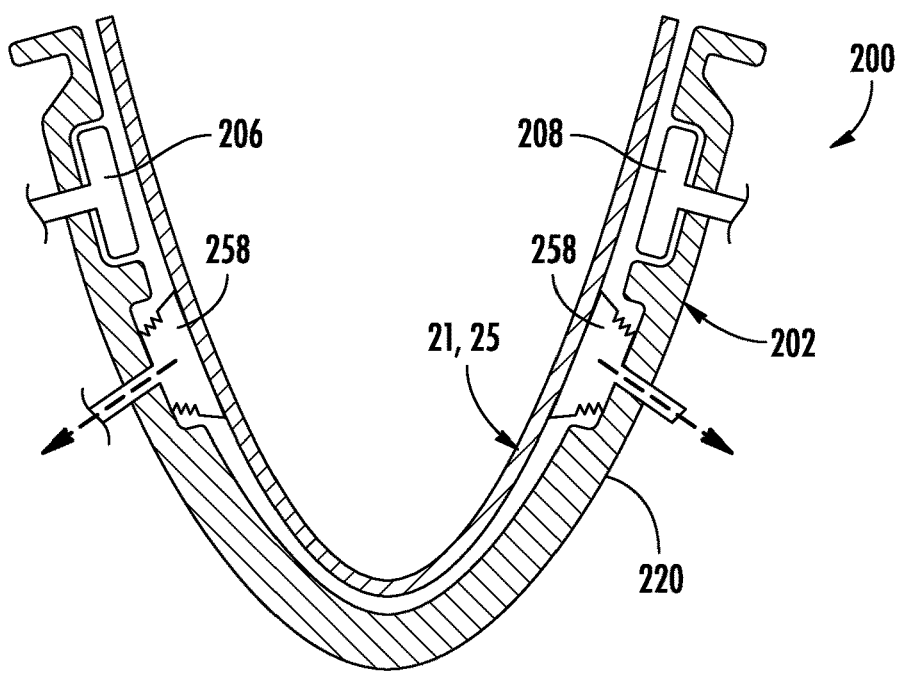
Figure 14C:
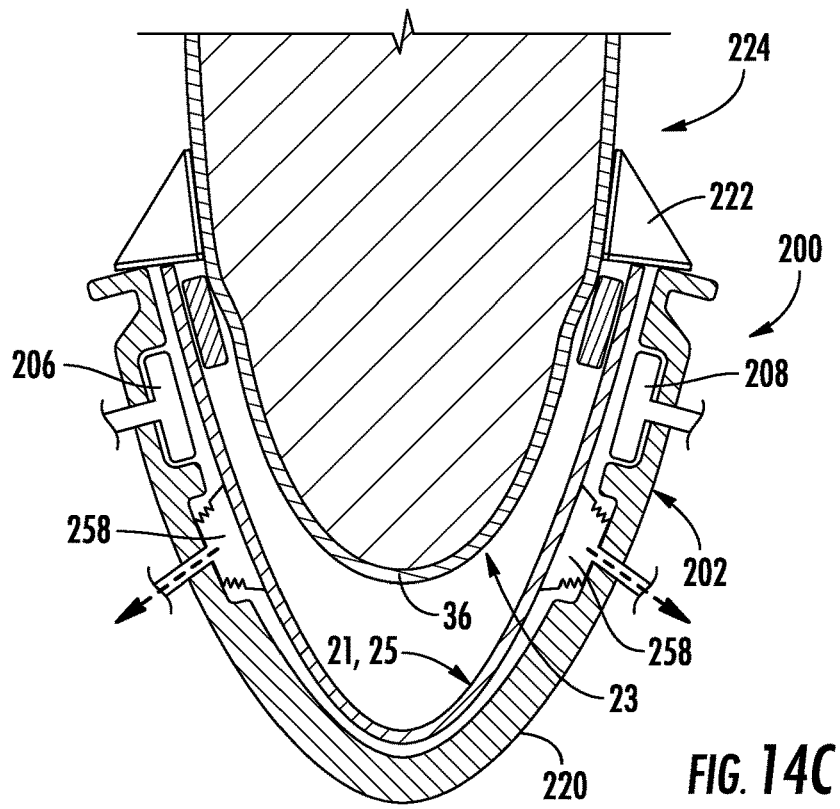
Figure 14D:
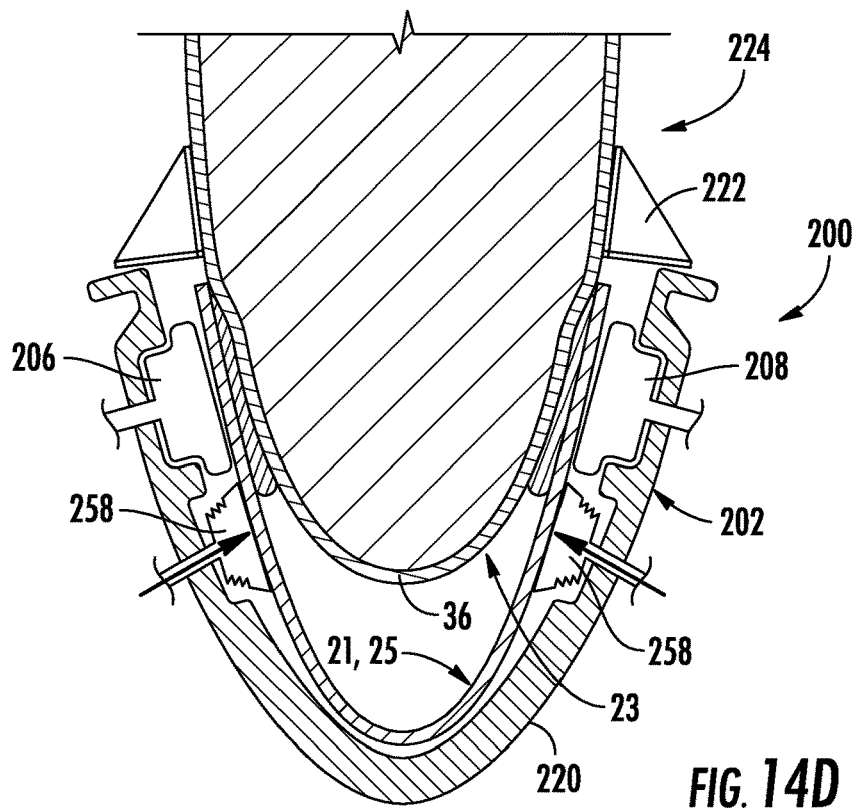

In particular, as shown in FIG. 13, the assembly fixture 200 includes the outer carrier 202, but rather than the inner carrier 204 shown in FIGS. 5-9, the embodiment of FIG. 13 includes an inner carrier in the form of one or more suction cups 258 arranged with the outer carrier 202. Thus, as shown in FIGS. 14A and 14B, the first blade segment 21 can be secured and retained within the outer carrier 202 by applying a vacuum to the suction cup(s) 258. In such embodiments, the assembly fixture 200 may include one suction cup 258 or more than one suction cup 258, such as two or more suction cups 258. For example, as shown in FIG. 13A, the assembly fixture 200 includes two suction 258, with one suction cup 258 on each side of the outer carrier 202. Accordingly, as shown in FIG. 14C, the second blade segment 23 can be lowered into the assembly fixture 200 optionally with the adhesive 210 being applied thereto, e.g., either before or after lowering, with the vacuum being maintained to the suction cups 258. Moreover, as shown in FIG. 14D, the bladder(s) 206, 208 can be inflated and the vacuum can be released such that the first blade segment 21 can be pushed against the second blade segment 23 at the joint 35 to dispense the adhesive and join the segments together.

Figure 15A:
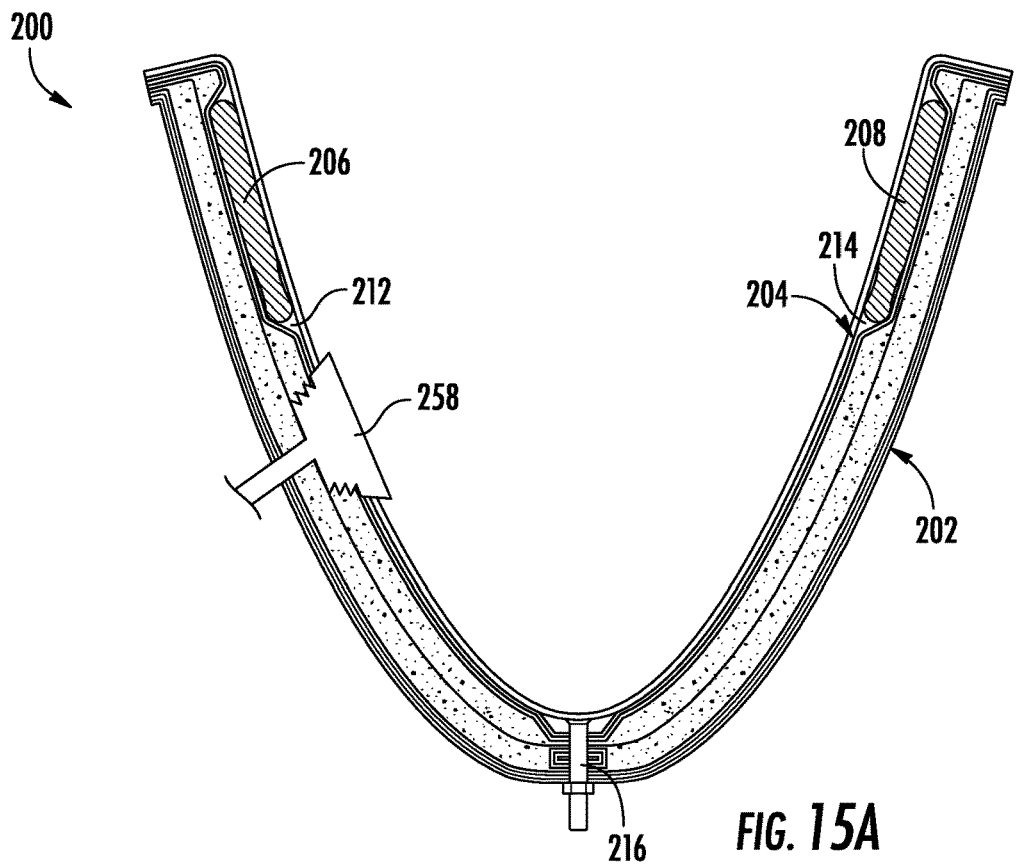
FIGS. 15A-15C illustrate various views of still another embodiment of an assembly fixture for securing rotor blade segments at a joint of a rotor blade according to the present disclosure.
Figure 15B:
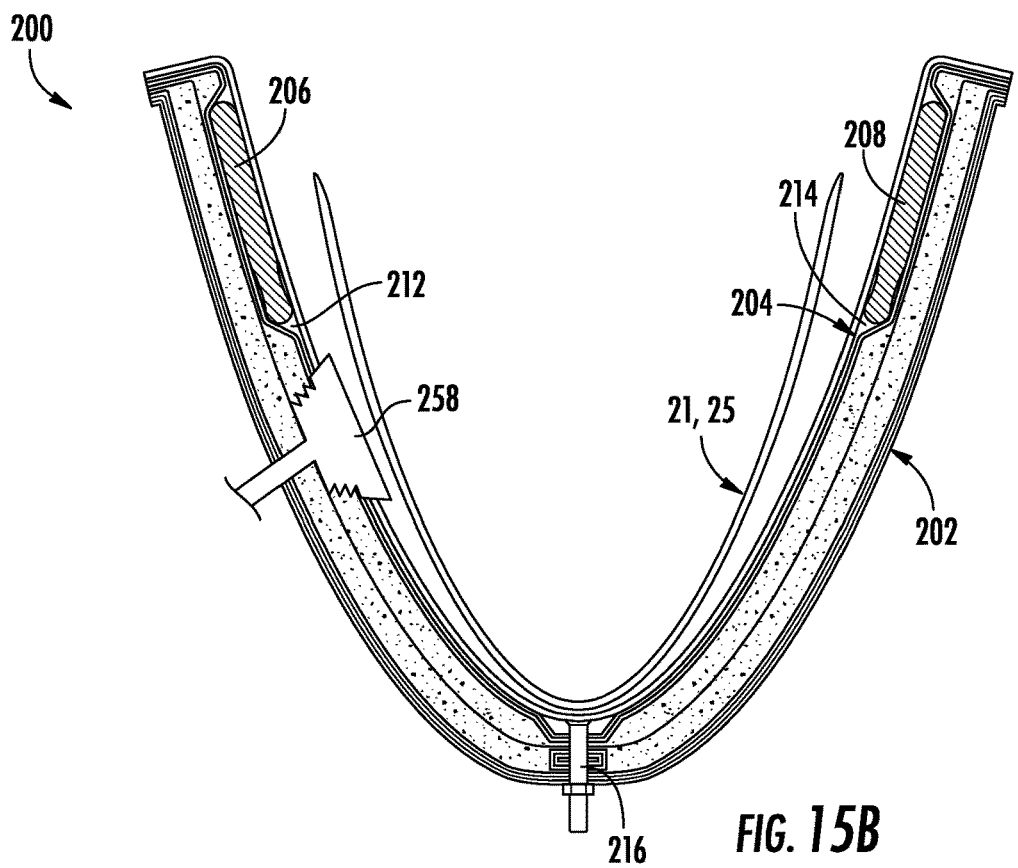
Figure 15C:
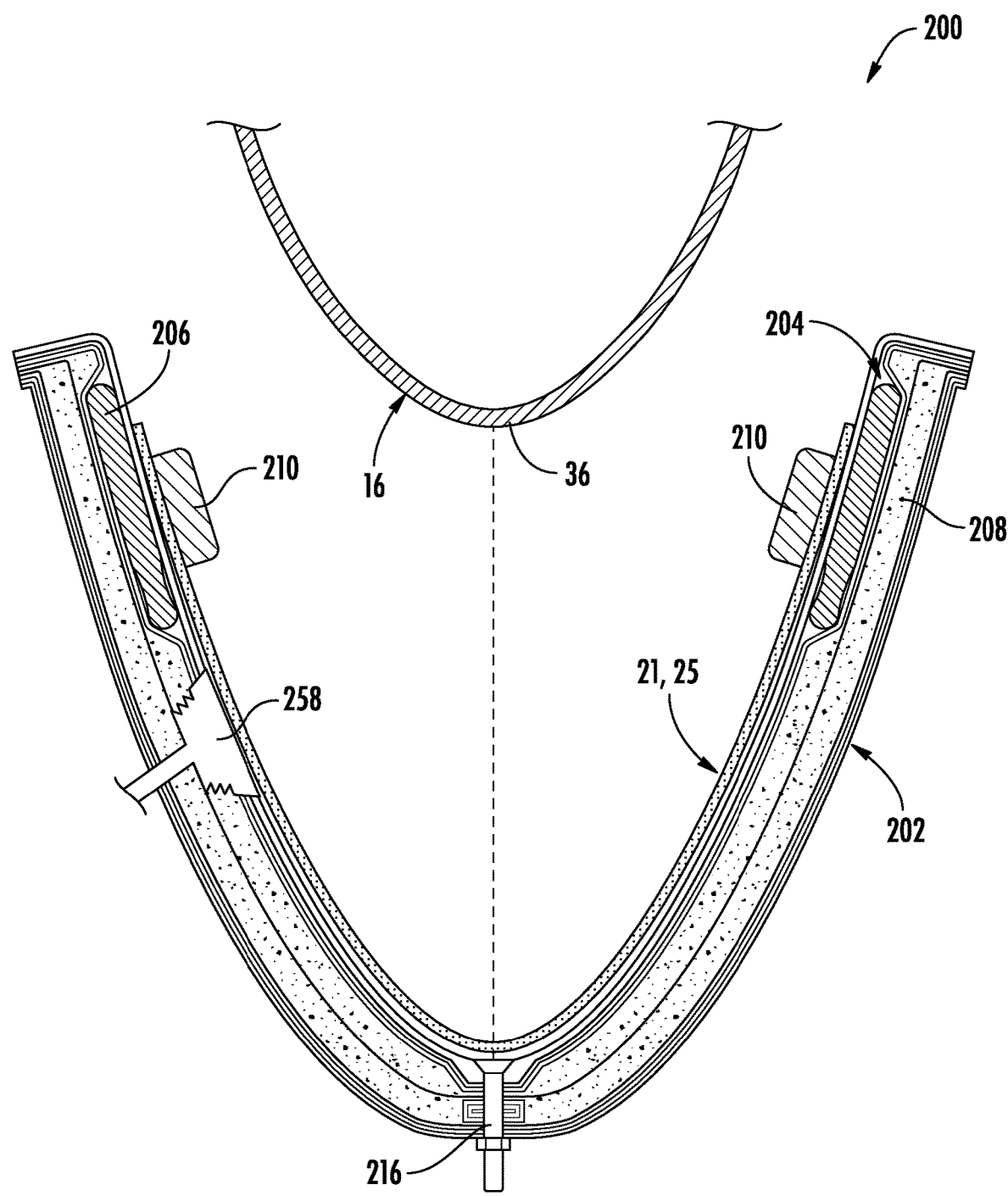

Referring now to FIGS. 15A-15C, various views of still another embodiment of an assembly fixture, such as assembly fixture 200, for securing rotor blade segments at a joint of a rotor blade according to the present disclosure are illustrated. As shown, in an embodiment, the assembly fixture 200 includes the inner carrier 204 and the outer carrier 202, similar to the embodiment of FIG. 5 described herein. Moreover, as shown, the inner carrier 204 may be secured to the outer carrier 202, for example, via one or more fasteners 216. Thus, such securement is configured to maintain alignment of the inner carrier 204 with respect to the outer carrier 202. Furthermore, as shown, the assembly fixture 200 includes at least one bladder 206, 208 arranged between the inner and outer carriers 202, 204. In particular embodiments, as shown, the assembly fixture 200 may include a first bladder 206 and a second bladder 208 arranged on opposite sides of the assembly fixture 200. More particularly, as shown, the bladder(s) 206, 208 may be arranged within a recess 212, 214 of the outer carrier 202. For example, as shown, the first and second bladders 206, 208 may be arranged within respective recesses 212, 214 on opposing sides of the assembly fixture 200. In addition, as shown, the assembly fixture 200 may include at least one suction cup 258 (or any suitable actuator) positioned at least partially through the inner and/or outer carriers 204, 202. Thus, as shown in the illustrated embodiment of FIGS. 15B and 15C, the suction cup(s) 258 is configured to reference the rotor blade 16 and the leading edge cap 25 to ensure proper alignment. Moreover, it should be understood that though the illustrated embodiment of FIGS. 15A-15C illustrate the assembly fixture 200 having one suction cup 258, more than one suction cup 258 may also be included, such as two or more suction cups 258, with one suction cup 258 being positioned on each side of the outer carrier 202.

Further aspects of the invention are provided by the subject matter of the following clauses:

A method for joining rotor blade segments of a rotor blade includes placing a first blade segment in an assembly fixture, the assembly fixture having an outer carrier and at least one bladder arranged with the outer carrier, the first blade segment having an adhesive applied at one or more locations; arranging the first blade segment with a second blade segment at at least one joint using the assembly fixture, wherein the adhesive is positioned at the at least one joint; inflating the at least one bladder to provide pressure to the at least one joint, wherein the pressure causes the adhesive to displace between the first and second blade segments at the at least one joint, thereby securing the first and second blade segments together at the at least one joint; and maintaining the pressure via the at least one inflated bladder to allow the adhesive to cure, thereby securing the first and second blade segments together.

A method for joining rotor blade segments of a rotor blade includes placing a first blade segment in an assembly fixture, the assembly fixture having an outer carrier and at least one bladder arranged with the outer carrier, the first blade segment having an adhesive applied at one or more locations; arranging the first blade segment with a second blade segment at at least one joint using the assembly fixture, wherein the adhesive is positioned at the at least one joint; inflating the at least one bladder to provide pressure to the at least one joint; and maintaining the pressure via the at least one inflated bladder to allow the adhesive to cure, thereby securing the first and second blade segments together.

The method of any preceding clause, wherein the assembly fixture further comprises an inner carrier arranged within the outer carrier, and wherein, when the at least one bladder is inflated, the inner carrier deflects towards the at least one joint so as to provide pressure to the at least one joint.

The method of any preceding clause, wherein the inner carrier is flexible and the outer carrier is rigid, the inner carrier being secured to the outer carrier.

The method of any preceding clause, wherein the assembly fixture further comprises one or more suction cups arranged within the outer carrier, the method further comprising: applying a vacuum to the one or more suction cups to draw the first blade segment against the outer carrier; and releasing the vacuum before inflating the at least one bladder.

The method of any preceding clause, wherein the at least one bladder is arranged within a recess of the outer carrier.

The method of any preceding clause, wherein the at least one bladder further comprises a first bladder and a second bladder arranged within recesses on opposing sides of the assembly fixture.

The method of any preceding clause, wherein arranging the first blade segment with the second blade segment at the at least one joint using the assembly fixture further comprises: securing the second blade segment above the first blade segment; and lifting the assembly fixture containing the first blade segment up to the second blade segment to arrange the first blade segment with the second blade segment.

The method of any preceding clause, wherein arranging the first blade segment with the second blade segment at the at least one joint using the assembly fixture further comprises: providing one or more bump stops on the second blade segment; and lifting the assembly fixture containing the first blade segment up to the second blade segment until the one or more bump stops contact the assembly fixture to arrange the first blade segment with the second blade segment at the at least one joint.

The method of any preceding clause, wherein arranging the first blade segment with the second blade segment at the at least one joint using the assembly fixture further comprises: securing one or more guide rails to the second blade segment; and aligning the second blade segment with the first blade segment using the one or more guide rails.

The method of any preceding clause, wherein securing the second blade segment above the first blade segment further comprises: securing at least one trailing edge protector to the second blade segment; and securing the assembly fixture to the at least one trailing edge protector via a lifting assembly.

The method of any preceding clause, wherein lifting the assembly fixture containing the first blade segment up to the second blade segment to arrange the first blade segment with the second blade segment further comprises:
lifting the assembly fixture containing the first blade segment up to the second blade segment using the lifting assembly, the lifting assembly comprising at least one of a hydraulic system, an actuator system, or a lift.

The method of any preceding clause, further comprising deflating the at least one bladder after the adhesive cures and lowering the assembly fixture away from the first and second blade segments.

The method of any preceding clause, further comprising removing the one or more bump stops after the adhesive cures.

The method of any preceding clause, wherein the first blade segment comprises a leading edge cap and the second blade segment comprises at least one of a suction side surface or a pressure side surface.

An assembly fixture for securing rotor blade segments at a joint of a rotor blade, the assembly fixture comprising: a rigid outer carrier; an adjustable inner carrier arranged within the outer carrier; and at least one bladder arranged with the outer carrier, wherein, upon inflating the at least one bladder, the at least one bladder provides pressure to the joint and adhesive at the joint secures the rotor blade segments together at the joint.

The assembly fixture of any preceding clause, wherein the adjustable inner carrier comprises one of a flexible inner carrier or one or more suction cups arranged within the outer carrier.

The assembly fixture of any preceding clause, wherein the adjustable inner carrier is secured to the rigid outer carrier via one or more fasteners.

The assembly fixture of any preceding clause, wherein the at least one bladder is arranged within a recess of the outer carrier.

The assembly fixture of any preceding clause, further comprising at least one of one or more bump stops or one or more guide rails on one or more of the rotor blade segments for arranging the rotor blade segments together at the joint.

The assembly fixture of any preceding clause, further comprising at least one blade protector for securing to one of the rotor blade segments and a lifting assembly for lifting the other of the rotor blade segments with respect to the other, the lifting assembly comprising at least one of a hydraulic system, an actuator system, or a lift.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for joining rotor blade segments of a rotor blade, the method comprising:
   placing a first blade segment in an assembly fixture, the assembly fixture having an outer carrier, an inner carrier arranged within and secured to the outer carrier at a connection point, and at least one bladder arranged between the outer and inner carriers, the first blade segment having an adhesive applied at one or more locations;
   arranging the first blade segment with a second blade segment at at least one joint using the assembly fixture, wherein the adhesive is positioned at the at least one joint;
   inflating the at least one bladder such that ends of the inner carrier deflect away from the outer carrier and towards the at least one joint so as to provide pressure to the at least one joint, wherein the pressure causes the adhesive to displace between the first and second blade segments at the at least one joint, thereby securing the first and second blade segments together at the at least one joint; and
   maintaining the pressure via the at least one inflated bladder to allow the adhesive to cure, thereby securing the first and second blade segments together.

2. The method of claim 1, wherein the inner carrier is flexible and the outer carrier is rigid.

3. The method of claim 1, wherein the assembly fixture further comprises one or more suction cups arranged within the outer carrier, the method further comprising:
   applying a vacuum to the one or more suction cups to draw the first blade segment against the outer carrier; and
   releasing the vacuum before inflating the at least one bladder.

4. The method of claim 1, wherein the at least one bladder is arranged within a recess of the outer carrier.

5. The method of claim 4, wherein the at least one bladder further comprises a first bladder and a second bladder arranged within recesses on opposing sides of the assembly fixture.

6. The method of claim 1, wherein arranging the first blade segment with the second blade segment at the at least one joint using the assembly fixture further comprises:
   securing the second blade segment above the first blade segment; and
   lifting the assembly fixture containing the first blade segment up to the second blade segment to arrange the first blade segment with the second blade segment.

7. The method of claim 6, wherein arranging the first blade segment with the second blade segment at the at least one joint using the assembly fixture further comprises:
   providing one or more bump stops on the second blade segment; and
   lifting the assembly fixture containing the first blade segment up to the second blade segment until the one or more bump stops contact the assembly fixture to arrange the first blade segment with the second blade segment at the at least one joint.

8. The method of claim 6, wherein arranging the first blade segment with the second blade segment at the at least one joint using the assembly fixture further comprises:
   securing one or more guide rails to the second blade segment; and
   aligning the second blade segment with the first blade segment using the one or more guide rails.

9. The method of claim 6, wherein securing the second blade segment above the first blade segment further comprises:
   securing at least one trailing edge protector to the second blade segment; and securing the assembly fixture to the at least one trailing edge protector via a lifting assembly.

10. The method of claim 9, wherein lifting the assembly fixture containing the first blade segment up to the second blade segment to arrange the first blade segment with the second blade segment further comprises:
  lifting the assembly fixture containing the first blade segment up to the second blade segment using the lifting assembly, the lifting assembly comprising at least one of a hydraulic system, an actuator system, or a lift.

11. The method of claim 7, further comprising deflating the at least one bladder after the adhesive cures and lowering the assembly fixture away from the first and second blade segments.

12. The method of claim 11, further comprising removing the one or more bump stops after the adhesive cures.

13. The method of claim 1, wherein the first blade segment comprises a leading edge cap and the second blade segment comprises at least one of a suction side surface or a pressure side surface.

\* \* \* \* \*